D. PEDERSEN.
HAY LOADER.
APPLICATION FILED OCT. 24, 1910.
1,002,438.
Patented Sept. 5, 1911.
2 SHEETS—SHEET 2.
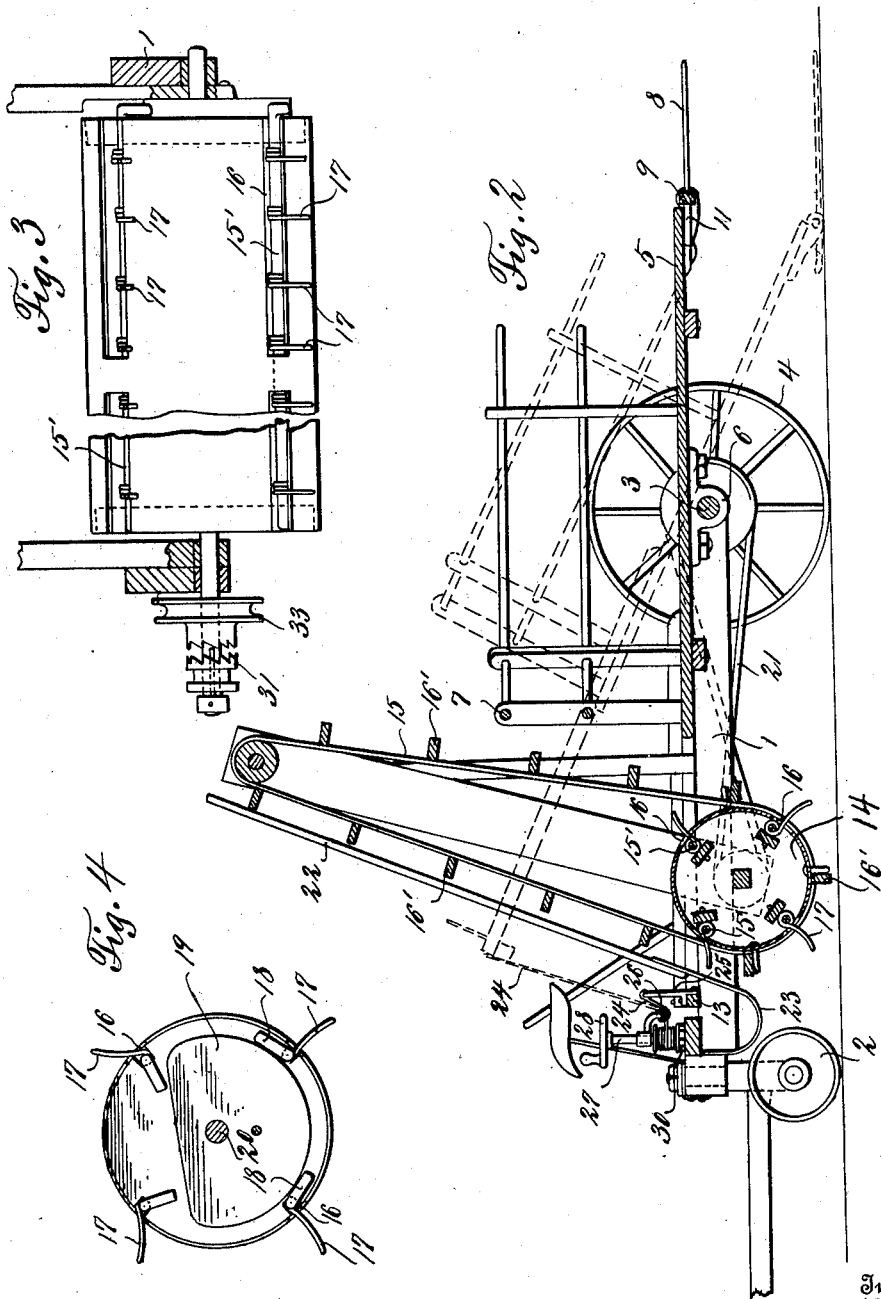
Witnesses
E. Larson
J. E. Dodge
Inventor
Dines Pedersen
By
Cobb & Cobb
Attorneys

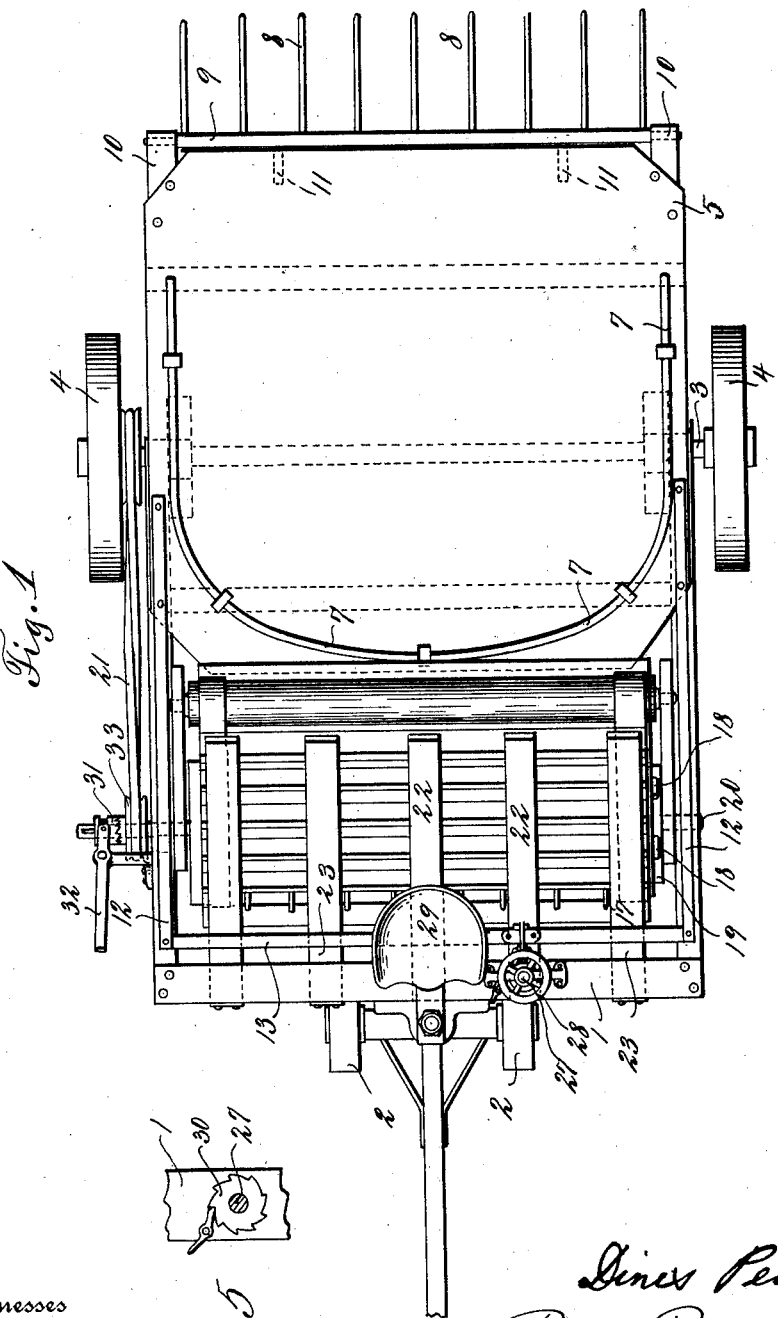

UNITED STATES PATENT OFFICE.

DINES PEDERSEN, OF DIKE, IOWA.

HAY-LOADER.

1,002,438.  Specification of Letters Patent.  Patented Sept. 5, 1911.

Application filed October 24, 1910. Serial No. 588,915.

*To all whom it may concern:*

Be it known that I, DINES PEDERSEN, a subject of the King of Denmark, residing at Dike, in the county of Grundy and State of Iowa, have invented certain new and useful Improvements in Hay-Loaders, of which the following is a specification.

This invention relates to that type of machines for loading hay embodying a wheeled vehicle adapted to be moved over a field, mechanism for picking up the hay to deposit the same upon a dropping or tilting platform, and associated details of construction.

The present invention resides particularly in the peculiar arrangement of the several mechanisms above referred to and certain details of construction.

For a full understanding of the present invention, reference is to be had to the following description and to the accompanying drawings, in which—

Figure 1 is a top plan view of the machine embodying the essential features of the present invention; Fig. 2 is a longitudinal sectional view; Fig. 3 is a transverse section bringing out more clearly the mounting of the picker drum; Fig. 4 is an end view of the picker drum and controlling cam associated therewith for coöperation with the picker shafts; Fig. 5 is a detail view of the ratchet means coacting with the winding shaft.

Throughout the following detail description and on the several figures of the drawings, similar parts are referred to by like reference characters.

In carrying out the invention, it is contemplated to provide a wheeled vehicle comprising a suitable frame 1, supported at its front end by small wheels 2 and having at its rear end the axle 3 supported on ground wheels 4. At the rear end of the frame 1 is mounted the dropping platform 5, the latter being pivoted at a point intermediate its front and rear ends to the axle 3, the latter passing through blocks 6 secured in a substantial manner to the under side of the platform 5. A curved railing 7 is supported on the platform 5 and is open at the rear end of said platform, the railing being provided to facilitate the formation of the hay into a small stack when the hay has been dropped on the platform 5.

A plurality of tines 8 project rearwardly from a pivoted bar 9, the latter being mounted at its ends in bearings 10 at the rear end of the platform 5. Normally the bar 9 is held in the position shown in Fig. 2 by means of lugs 11 projecting forwardly from said bar and engaging beneath the rear end portion of the platform 5. When the platform 5, however, is situated so as to assume the position shown in dotted lines in Fig. 2, the tines or teeth 8 are free to yield upwardly as they strike the ground, permitting a portion of the hay stacked on the platform to engage with the ground in such a manner as to have sufficient friction to pull the stack from the platform. When the platform 5 is raised to its normal horizontal position by suitable means to be hereinafter described, the weight of the tines or teeth 8 causes the same to assume their original horizontal positions by gravitating movement.

Projecting forwardly from the front end of the platform 5 are the spaced arms 12 connected together by a transverse bar 13 situated just in the rear of the front end of the main frame 1 of the machine. The bar 13 is the means by which the platform 5 is returned to its horizontal position after dropping the stack. In rear of the front wheels 2 of the frame of the machine, and between said wheels and the front end of the platform 5 is disposed a transverse picker drum 14, said drum also constituting the lower member of an elevator 15, the latter being of the usual endless belt type, having the carriers or flights 16′ adapted to receive the hay thereon as it is picked up by the drum 14, whereupon the hay is elevated and dropped upon the platform 5 in the well known manner.

The drum 14 carries a plurality of picker shafts 15′, and the drum is provided with openings in its periphery, as shown at 16, picker teeth 17 being carried by the shafts 15′ and projecting through the openings 16. At one end of the drum the several shafts 15′ are provided with arms 18 operating in contact with a cam 19 which is stationary on the supporting axis 20 of the drum. As the drum rotates therefore, being driven by a belt connection 21 with the rear axle 3, it will be apparent that the arms 18 operating in contact with the cam 19, will cause the picker teeth 17 to fall or drop slightly, as said teeth deliver the hay to the front lower end portion of the elevator 15, thus preventing the hay from being nipped or caught between the picker teeth 17 and the endless connections forming the elevator 15.

Between the elevator 15 and the transverse platform tilting bar 13 of the platform 5 are arranged a plurality of pressure bars 22 extending upwardly substantially the whole length of the elevator 15 and adapted to hold the hay upon the flights 16′ of said elevator. The various pressure bars 22 are supported at their lower ends by the springs 23 secured to the front cross bar of the frame 1, and the forward or yielding movement of the bars 22 will be resisted at a certain point by engagement of the rear portions of the springs 23 with the platform tilting bar 13 of the platform 5.

The stack when dropped upon the platform 5 will be of sufficient weight, of course, to gravitate with the platform when the latter tilts on release of suitable mechanism, the latter mechanism being of any suitable type but illustrated as a cable or rope 24 attached at one end to a standard 25 projecting upwardly from the operating bar 13, said rope passing under a pulley 26 and thence around the winding shaft 27 supported at the front of the frame 1. A hand wheel 28 near the seat 29 will be used to turn the shaft 27 to wind the rope 24 thereon in order to restore the platform 5 to its normal horizontal position. Ratchet mechanism 30 coacting with the winding shaft 27 may be released in any suitable way to permit the platform to drop after a stack has been formed thereon.

If desired, a clutch 31 and operating lever 32 may be used to disconnect or connect the driving member 20 of the picker drum and elevator with respect to the drive pulley 33, around which the belt 21 passes, in order to prevent operation of the parts 14 and 15.

Having thus described my invention, what is claimed as new is:

1. In a hay loader, the combination of a wheeled frame, a dropping platform mounted centrally thereon, an elevator arranged in advance of said platform for depositing hay thereon, said elevator including a plurality of yielding pressure bars, and means for operating the dropping platform comprising a member coacting with the pressure bars on the elevator to limit the yielding movement of the latter.

2. In a hay loader, the combination of a wheeled frame, a dropping platform mounted at the rear end thereof and pivotally supported centrally of its ends for tilting movement, an elevator arranged at the front portion of the machine to deposit the hay on the dropping platform, said elevator including a plurality of yielding pressure bars at the front of the same, spaced arms projecting forwardly from the dropping platform on opposite sides of the elevator, a transverse bar connecting said spaced arms and arranged in front of the yielding pressure bars to limit the yielding movement of the latter, means operatively connected with said transverse bar to restore the dropping platform to its normal position after depositing its load upon the ground, and a plurality of teeth pivotally connected with the discharge end of the dropping platform, and yieldable upwardly as they are engaged with the ground on tilting of the platform.

In testimony whereof I affix my signature in presence of two witnesses.

DINES PEDERSEN.

Witnesses:
JEPPE J. SCHULTZ,
JENS HOLBJERG.

---

Copies of this patent may be obtained for five cents each, by addressing the "Commissioner of Patents, Washington, D. C."